US008430060B2

(12) United States Patent
Hoffman et al.

(10) Patent No.: US 8,430,060 B2
(45) Date of Patent: Apr. 30, 2013

(54) ROLLING AND FOLDING PET BED

(75) Inventors: Rebecca A Hoffman, Collegeville, PA (US); Jeffrey T Hoffman, Collegeville, PA (US); David Conroy, Brooklyn, NY (US)

(73) Assignee: Gemini Management Group, LLC, Collegeville, PA (US)

( * ) Notice: Subject to any disclaimer, the term of this patent is extended or adjusted under 35 U.S.C. 154(b) by 181 days.

(21) Appl. No.: 13/112,279

(22) Filed: May 20, 2011

(65) Prior Publication Data

US 2012/0291710 A1    Nov. 22, 2012

(51) Int. Cl.
*A01K 1/035*      (2006.01)
*A01K 29/00*      (2006.01)

(52) U.S. Cl.
USPC ........................................ 119/28.5

(58) Field of Classification Search ........... 119/28.5, 119/168; 5/175, 181, 202, 620, 655, 653, 5/656, 657
See application file for complete search history.

(56) References Cited

U.S. PATENT DOCUMENTS

| | | | |
|---|---|---|---|
| 2,397,017 A | 3/1946 | Krakauer | |
| 2,617,999 A | 11/1952 | Mitchell | |
| 2,644,960 A * | 7/1953 | Blanke et al. | ...................... 5/185 |
| 3,295,149 A | 1/1967 | Hall | |
| 3,755,832 A | 9/1973 | Bennett | |
| 4,048,683 A | 9/1977 | Chen | |
| RE30,151 E * | 11/1979 | Nowell | ............... 5/181 |
| 4,198,718 A | 4/1980 | Ballard | |
| 5,386,601 A | 2/1995 | Kohl | |
| 6,035,467 A | 3/2000 | Lee | |
| 6,035,468 A | 3/2000 | Lee | |
| 6,553,586 B1 | 4/2003 | Lin | |
| 6,684,426 B1 | 2/2004 | Lin | |
| 7,493,667 B2 | 2/2009 | Ferko, III | |
| 7,861,338 B2 | 1/2011 | Lee | |
| 2004/0055085 A1 | 3/2004 | Boscaro | |
| 2005/0211175 A1 | 9/2005 | Johnson | |
| 2007/0277317 A1 | 12/2007 | Ferko | |
| 2008/0276872 A1 | 11/2008 | Chern | |
| 2009/0249545 A1 * | 10/2009 | Lee | ................... 5/111 |

FOREIGN PATENT DOCUMENTS

WO      9601066      1/1996

* cited by examiner

*Primary Examiner* — Son T Nguyen
*Assistant Examiner* — Kathleen Iwasaki
(74) *Attorney, Agent, or Firm* — North Shore Patents, P.C.; Michele Liu Baillie

(57) ABSTRACT

A folding pet bed includes a frame with a top face and a bottom face and includes: a spine; a first and second frame plates coupled to the spine to form rotating joints; the first and second frame plates including flexible arms, where each of the flexible arms includes a first end fixably coupled to the corresponding frame plate and a second end not fixably coupled to the corresponding frame plate; and a plurality of casters coupled to the second ends of the flexible arms at the bottom face of the frame. The pet bed further includes trays coupled to the frame plates at the top face of the frame upon which a pet may rest. The trays may be rotated toward each other to place the pet bed in a folded position for easy movement and storage.

17 Claims, 10 Drawing Sheets

TOP ISOMETRIC VIEW

TOP ISOMETRIC VIEW

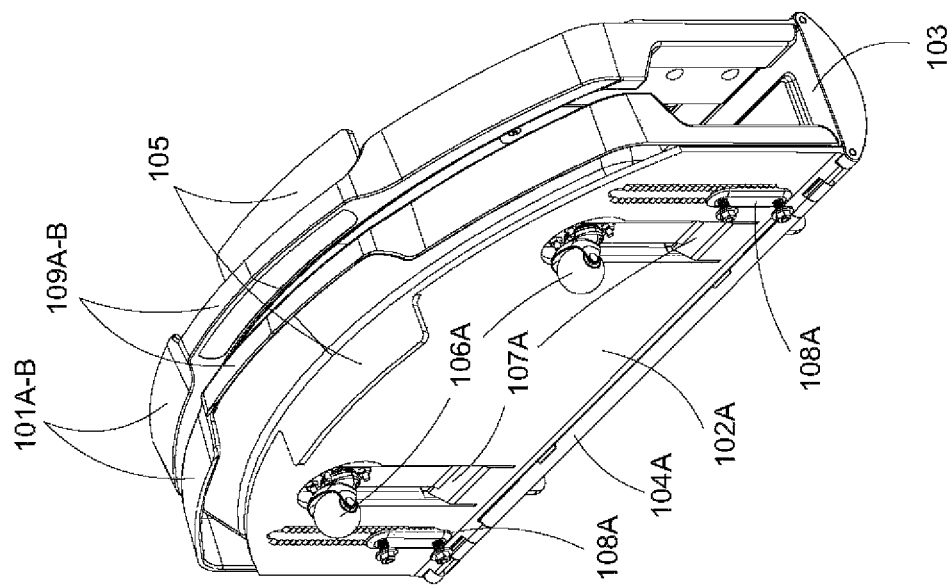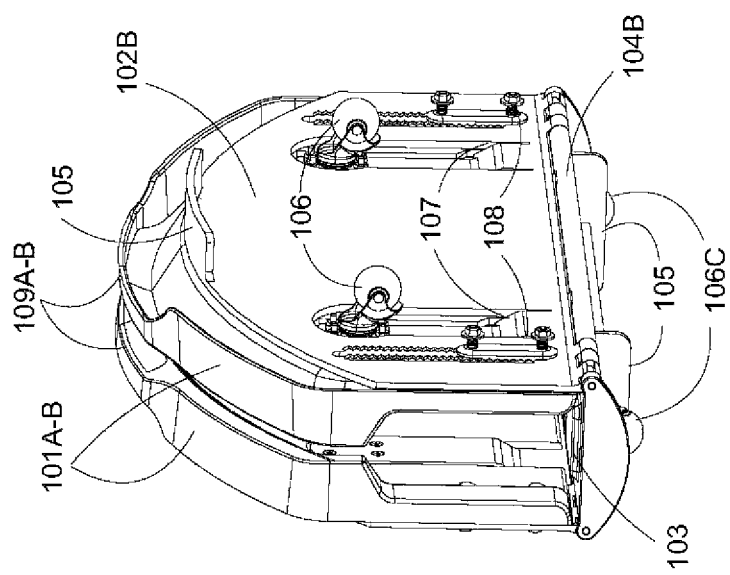
Fig. 2

Exploded View

ROLLING AND FOLDING PET BED

BACKGROUND OF THE INVENTION

1. Field of the Invention

The present invention relates to beds for pets.

2. Related Art

Pet owners commonly provide beds for their pets. Many pet beds are stationary and rest directly on a surface, such as the floor or a piece of furniture. Pet owners occasionally will want to remove or stow the pet bed away, such as when guests are expected or when a room is to be cleaned. However, many pet beds are bulky, heavy or awkward to stow. Depending on the size of the pet, the pet bed may also be quite large, making it particularly difficult to stow or move.

BRIEF SUMMARY OF THE INVENTION

According to one embodiment of the present invention, a folding pet bed comprises: a frame, comprising a top face and a bottom face. The frame further comprises: a spine comprising a first side and a second side opposite to the first side; a first frame plate coupled to the first side of the spine to form a first rotating joint; a second frame plate coupled to the second side of the spine to form a second rotating joint; the first frame plate comprising a first plurality of flexible arms; the second frame plate comprising a second plurality of flexible arms, wherein each of the first and second pluralities of flexible arms comprises a first end fixably coupled to the corresponding frame plate and a second end not fixably coupled to the corresponding frame plate; and a plurality of casters coupled to the second ends of the first and second pluralities of flexible arms at the bottom face of the frame. The pet bed further comprises: a first tray coupled to the first frame plate at the top face of the frame; and a second tray coupled to the second frame plate at the top face of the frame.

In one aspect of the present invention, the first tray comprises a first plurality of slots, and the second ends of the first plurality of flexible arms are able to flex through the first plurality of slots, wherein the second tray comprises a second plurality of slots, wherein the second ends of the second plurality of flexible arms are able to flex through the second plurality of slots.

In one aspect of the present invention, the plurality of casters rest upon a surface when the pet bed resides in an unfolded position, wherein upon application of weight on the first and second trays toward the surface, the first and second pluralities of flexible arms flex away from the top surface of the frame.

In one aspect of the present invention, the frame further comprises a plurality of feet, wherein upon the application of the weight on the first and second trays toward the surface, the plurality of feet contact the surface.

In one aspect of the present invention, the first tray coupled to the first frame plate and the second tray coupled to the second frame plate are each rotated along the first and second rotating joints to place the pet bed in a folded position.

In one aspect of the present invention, the frame further comprises a set of casters coupled to the spine.

In one aspect of the present invention, the folding pet bed further comprises: the first tray comprising a first plurality of holes; the first frame plate comprising a first plurality of slots and a first plurality of teeth proximate to the first plurality of slots; and a first plurality of tray locks. The first plurality of tray locks comprises: a first plurality of plates comprising a first plurality of teeth; and a first plurality of fasteners traversing the first plurality of holes of the first tray and the first plurality of slots of the first frame plate and coupled to the first plurality of plates, wherein the first plurality of teeth of the first plurality of plates engage the first plurality of teeth proximate to the first plurality of slots when the first plurality of fasteners are tightened.

In one aspect of the present invention, the folding pet bed further comprises: the second tray comprising a second plurality of holes; the second frame plate comprising a second plurality of slots and a second plurality of teeth proximate to the second plurality of slots; and a second plurality of tray locks. The second plurality of tray locks comprises: a second plurality of plates comprising a second plurality of teeth; and a second plurality of fasteners traversing the second plurality of holes of the second tray and the second plurality of slots of the second frame plate and coupled to the second plurality of plates, wherein the second plurality of teeth of the second plurality of plates engage the second plurality of teeth proximate to the second plurality of slots when the second plurality of fasteners are tightened.

In one aspect of the present invention, when the first plurality of teeth of the first plurality of plates do not engage the first plurality of teeth proximate to the first plurality of slots, the first plurality of fasteners are movable within the first plurality of slots to move the first tray toward or away from the spine.

In one aspect of the present invention, when the second plurality of teeth of the second plurality of plates do not engage the second plurality of teeth proximate to the second plurality of slots, the second plurality of fasteners are movable within the second plurality of slots to move the second tray toward or away from the spine.

In one aspect of the present invention, the first rotating joint comprises a first detent and the second rotating joint comprises a second detent, the first detent comprising a first knot, the second detent comprising a second knot, wherein rotating the first tray past the first knot locks the first tray in the folded position, wherein rotating the second tray past the second knot locks the second tray in the folded position.

BRIEF DESCRIPTION OF THE SEVERAL VIEWS OF THE FIGURES

FIG. 2 illustrates two isometric views of the pet bed in a folded position according to an embodiment of the present invention.

DETAILED DESCRIPTION OF THE INVENTION

The present invention provides a rolling and folding pet bed. The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, elements, components, and/or groups thereof.

Figure 1A:
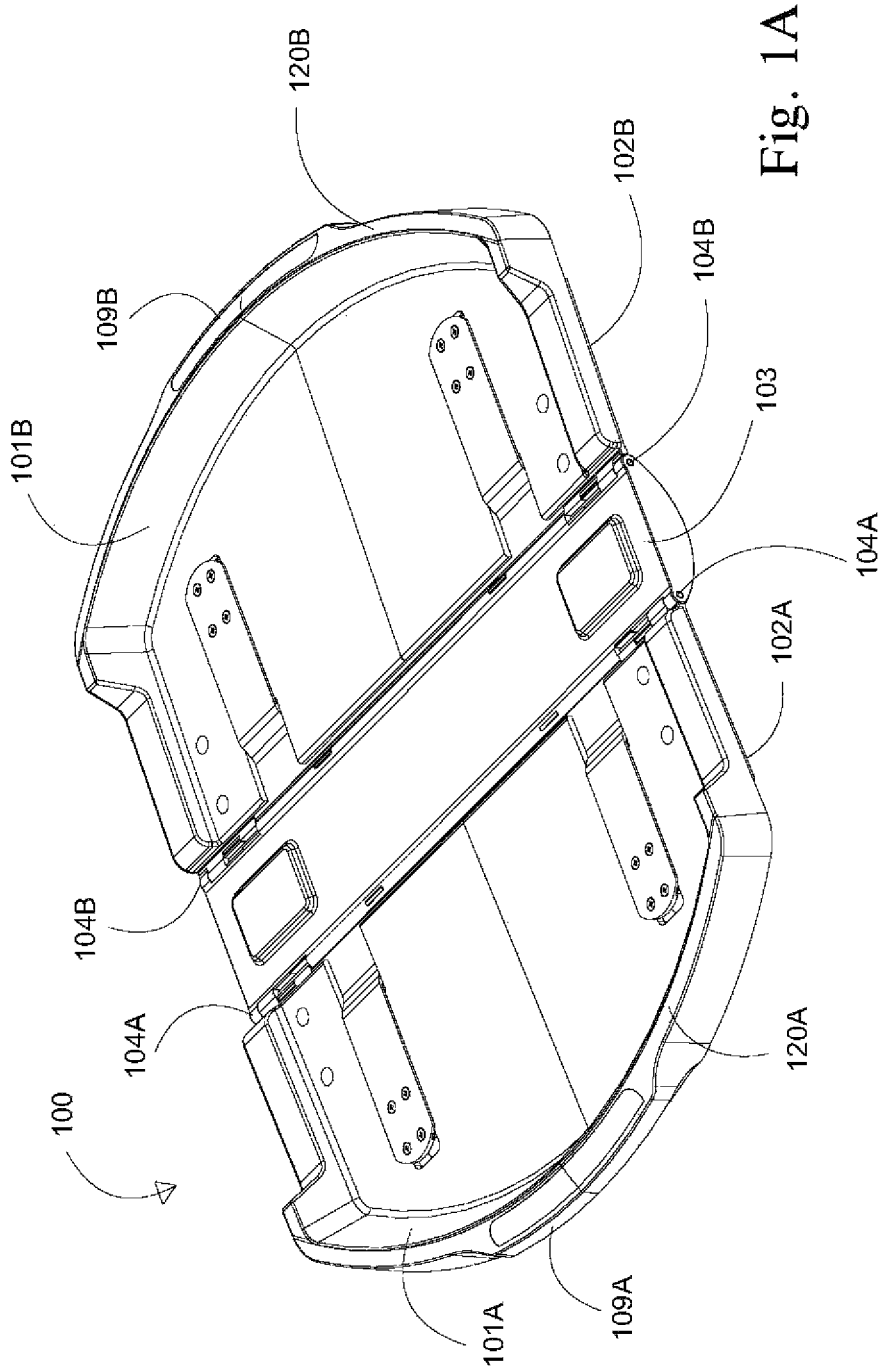
FIGS. 1A and 1B illustrate a top isometric view and a bottom isometric view, respectively, of the pet bed according to an embodiment of the present invention.
Figure 1B:
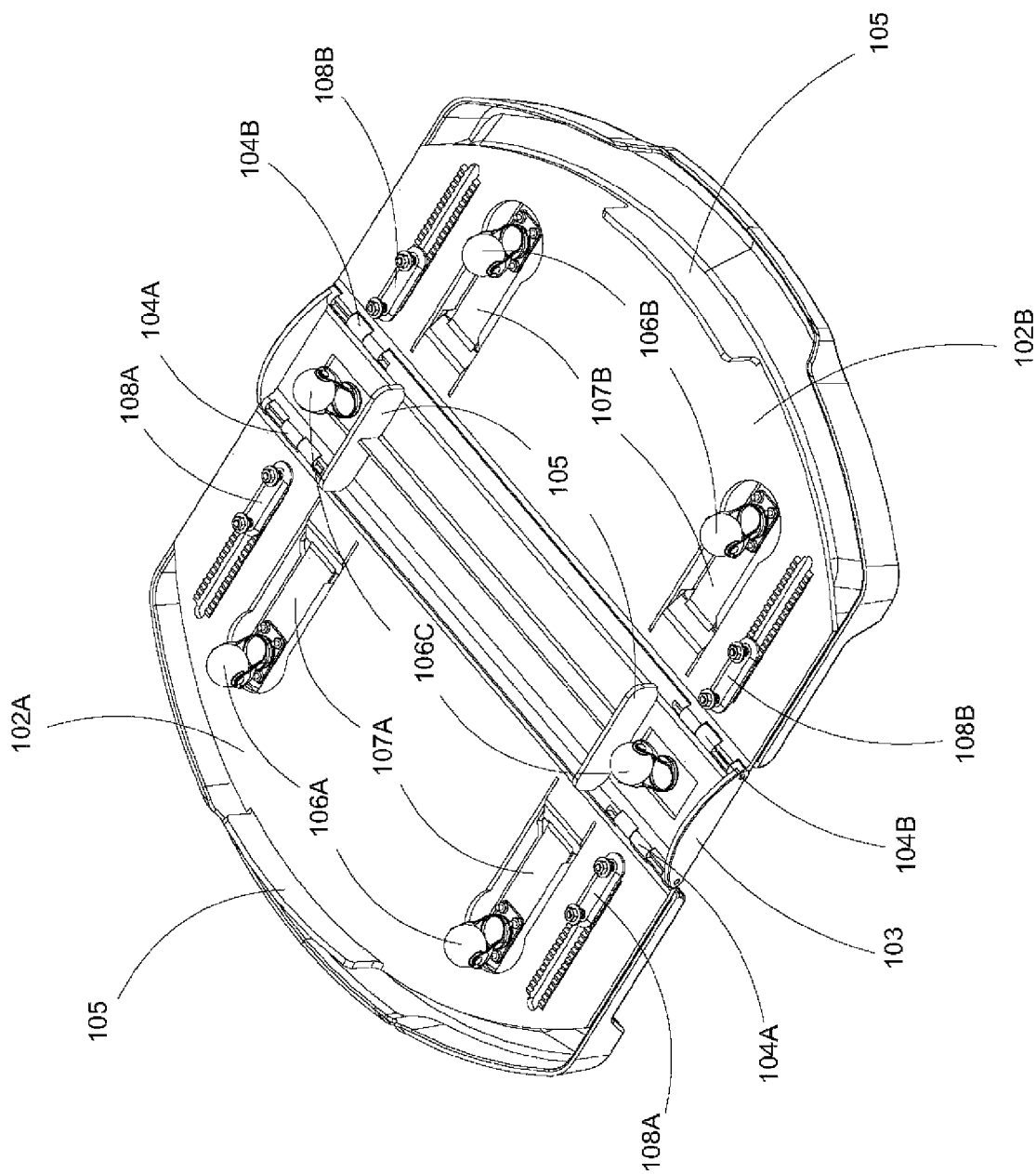

The present invention provides a pet bed designed to roll and fold for easy movement and storage. FIGS. 1A and 1B illustrate a top isometric view and a bottom isometric view, respectively, of the pet bed according to an embodiment of the present invention. The pet bed 100 comprises two trays 101A-101B, each coupled to a frame. The frame comprises a spine 103 with a first side and a second side opposite the first side. The frame further comprises two frame plates 102A-102B. The first frame plate 102A coupled to the first side of the spine 103, forming a first set of rotating joints 104A. The second frame plate 102B coupled to the second side of the spine 103, forming the second set of rotating joints 104B. Each frame plate 102A-102B comprises a set of flexible arms 107A-107B, and each tray 101A-101B is coupled to their respective frames 102A-102B through the use of tray locks 108A-108B. The pet bed 100 further comprise a set of feet 105, one coupled to each frame plate 102A-102B and two coupled to the spine 103. Further, a set of casters 106A-106B are coupled to each frame plate 102A-102B. In this embodiment, a caster is coupled to each flexible arm 107A-107B of the frame plates 102A-102B. A set of casters 106C are coupled to the spine 103. Each tray 101A-101B comprises a handle 109A-109B, preferably integrally molded to the trays 101A-101B. In this embodiment, each tray 101A-101B comprises lips 120A-120B to facilitate the holding of a mattress or pad.

Figure 3:
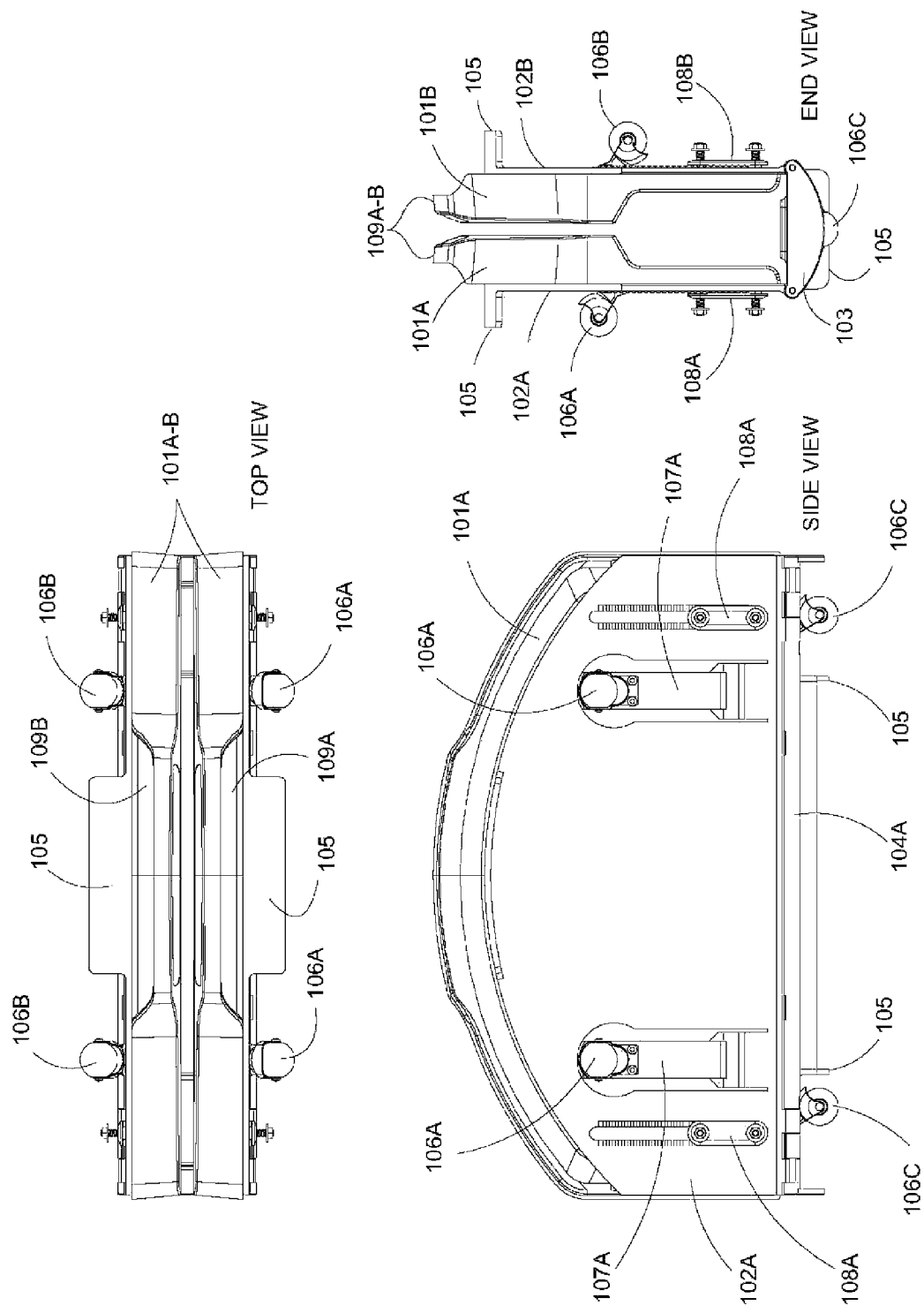
FIG. 3 illustrates top, side, and end orthogonal views of the pet bed in the folded position according to an embodiment of the present invention.

FIG. 2 illustrates two isometric views of the pet bed in a folded position according to an embodiment of the present invention. FIG. 3 illustrates top, side, and end orthogonal views of the pet bed in the folded position according to an embodiment of the present invention. To fold the pet bed 100, the trays 101A-101B coupled to the frame plates 102A-102B are rotated around the rotating joints 104A-104B such that the handles 109A-109B move toward each other. The frame plates 102A-102B may be locked in the folded position through detents in the rotating joints 104A-104B, as described further below. When folded, the pet bed 100 may be more easily stowed or rolled away when not in use, in either a vertical or horizontal orientation. Further, the frame and trays 101A-101B may be composed of thin, lightweight plastic, making the pet bed 100 easier to move or carry.

Figure 4:
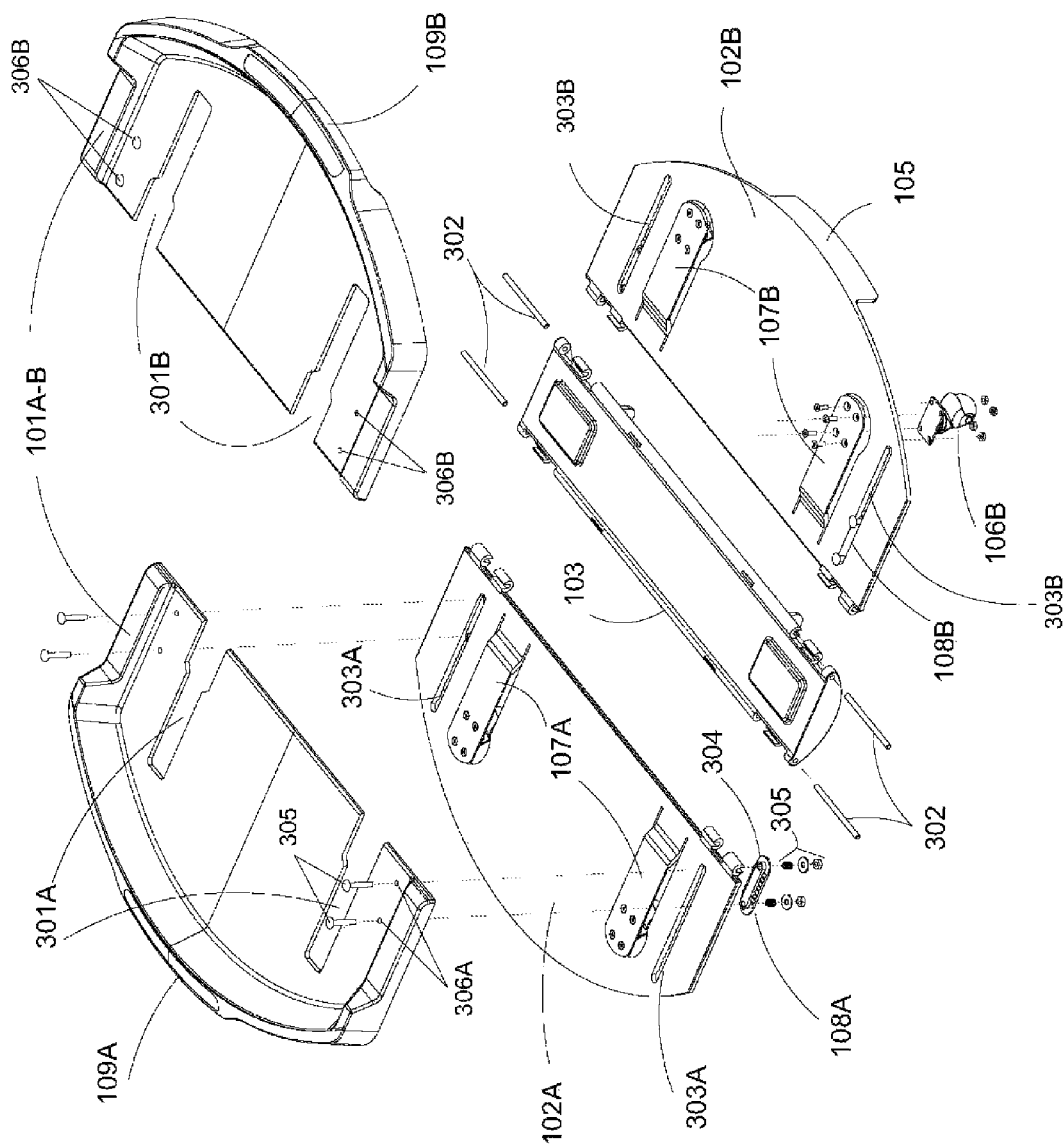
FIG. 4 illustrates an exploded view of the pet bed according to an embodiment of the present invention.

FIG. 4 illustrates an exploded view of the pet bed according to an embodiment of the present invention. As illustrated, the trays 101A-101B each comprise a set of slots 301A-301B and a set of holes 306A-306B. The frame plates 102A-102B each comprise a set of slots 303A-303B with teeth (not shown) proximate to the slots 303A-303B on the bottom face of the frame plates 102A-102B. The frame plates 102A-102B are each coupled to the spine 103 through a set of pins 302, forming the rotating joints 104A-104B. Each tray lock 108A-108B comprises a set of fasteners 305 that couples the trays 101A-101B to plates 304. Plates 304 reside at the bottom face of the frame plates 102A-102B and comprise teeth. The fasteners 305 traverse through the holes 306A-306B of the trays 101A-101B, the slots 303A-303B in the frame plates 102A-102B, and couple to the plates 304. The slots 303A-303B are oriented such that the fasteners 305 may move within the slots 303A-303B toward and away from the spine 103, thus also moving the trays 101A-101B toward and away from the spine 103. In this manner, the width of the pet bed 100, i.e., the total distance between the handles 109A-109B, may be adjusted to accommodate various sized cushions, pads, or mattresses. When the fasteners 305 are tightened, the teeth on the plates 304 engage the teeth proximate to their corresponding slots 303A-303B, preventing the trays 101A-101B from moving. When the trays 101A-101B are coupled to the frame plates 102A-102B via the fasteners 305 and plates 304, as set forth above, the flexible arms 107A-107B of the frame plates 102A-102B reside within the slots 301A-301B such that the flexible arms 107A-107B are free to flex, as described further below.

Figure 5:
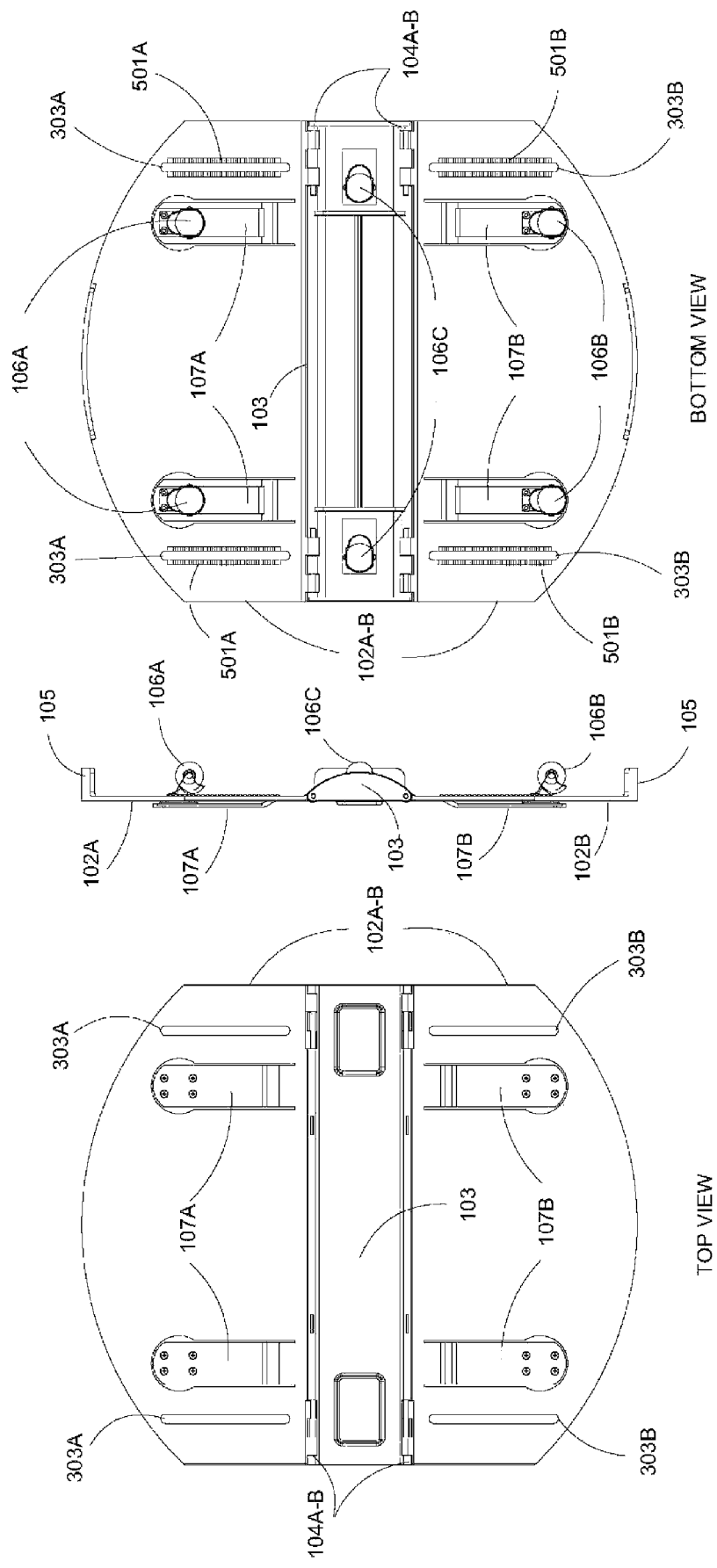
FIG. 5 illustrates in top, end, and bottom orthogonal views, more details of the frame plates and spine of the pet bed according to an embodiment of the present invention.

FIG. 5 illustrates in top, end, and bottom orthogonal views, more details of the frame plates 102A-102B and spine 103 of the pet bed according to an embodiment of the present invention. As illustrated, casters 106A-106B are coupled to the flexible arms 107A-107B. Each flexible arm 107A-107B comprises an end proximate to the spine 103 and an end distal from the spine 103. In this embodiment, the casters 106A-106B are coupled to the distal end of the flexible arms 107A-107B. The proximate ends are fixably coupled to the frame plates 102A-102B, while the distal ends are not, allowing them to flex. In this embodiment, the casters 106C coupled to the spine 103 are fixably coupled to the spine 103. Further in this embodiment, the teeth 501A-501B proximate to the slots 303A-303B reside on the bottom face of the frame plates 102A-102B, as illustrated in the bottom view. Each plate 304 (see FIG. 4) of the tray locks 108A-108B are positioned to contact the bottom surface of the frame plates 102A-102B so that the teeth of each plate 304 contact the teeth 501A-501B proximate to its corresponding slot 303A-303B.

Figure 6:
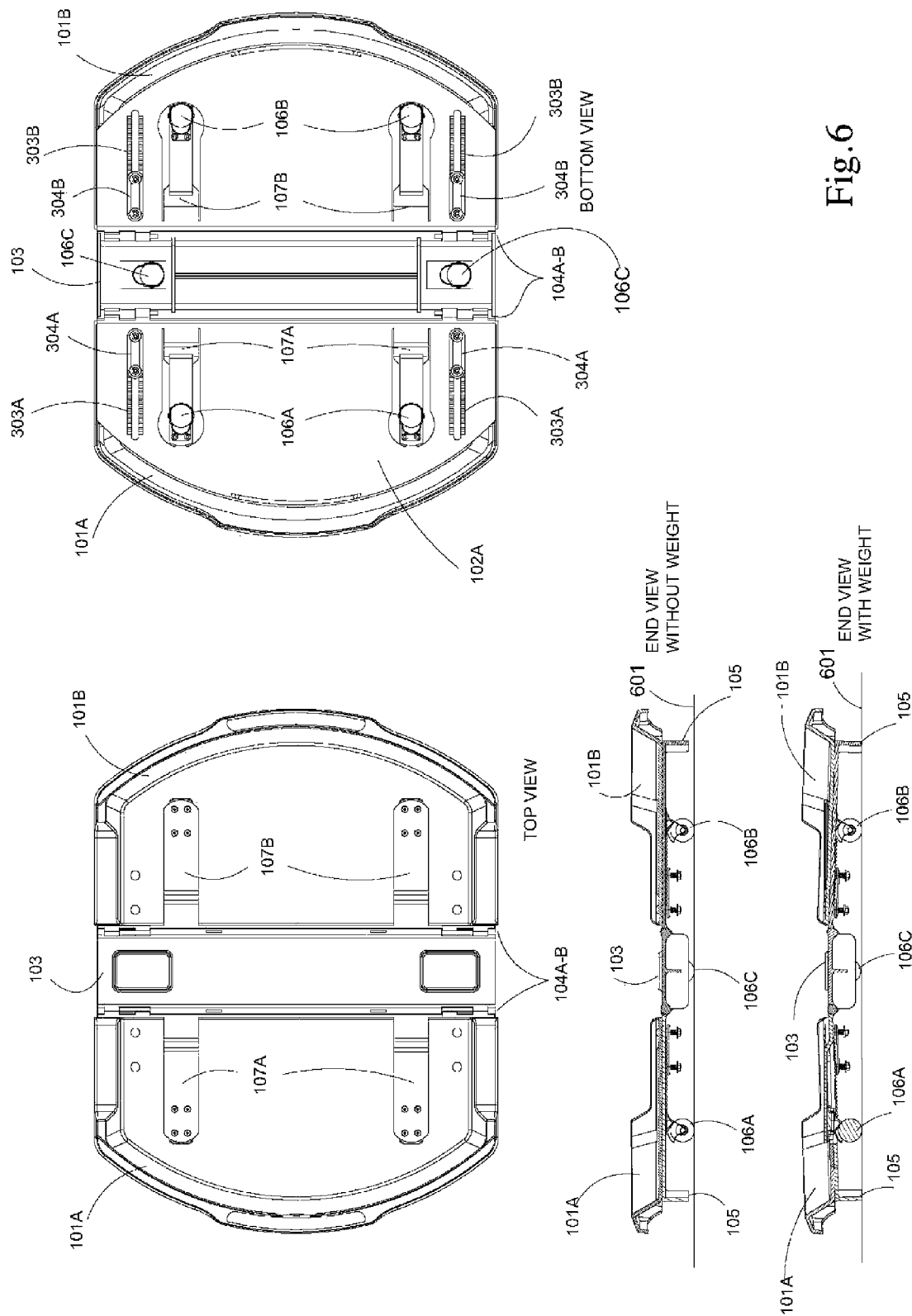
FIG. 6 illustrates top and bottom orthogonal views of the pet bed, and an end view with and without weight on the pet bed, according to an embodiment of the present invention.

FIG. 6 illustrates top and bottom orthogonal views of the pet bed, and an end view with and without weight on the pet bed, according to an embodiment of the present invention. As illustrated in the end views, when there is no weight placed on the pet bed 100, the casters 106A-106C each contact a surface 601, while the feet 105 of the frame plates 102A-102B and spine 103 do not. The trays 101A-101B provide a surface upon which a pet may rest, either with or without a cushion or mattress. When a pet rests on the trays 101A-101B, applying weight to the pet bed 100, the flexible arms 107A-107B allow the casters 106A-106B to flex away from the top surface of the frame, such that the trays 101A-101B and frame are able to move toward the surface 601 until the feet 105 contacts the surface 601. The weight of the pet on the trays 101A-101B may also provide enough force so that the casters 106A-106C are essentially "locked", i.e., not easily moved, while the pet is on the pet bed 100. This allows the pet bed 100 to be used safely.

Figure 7:
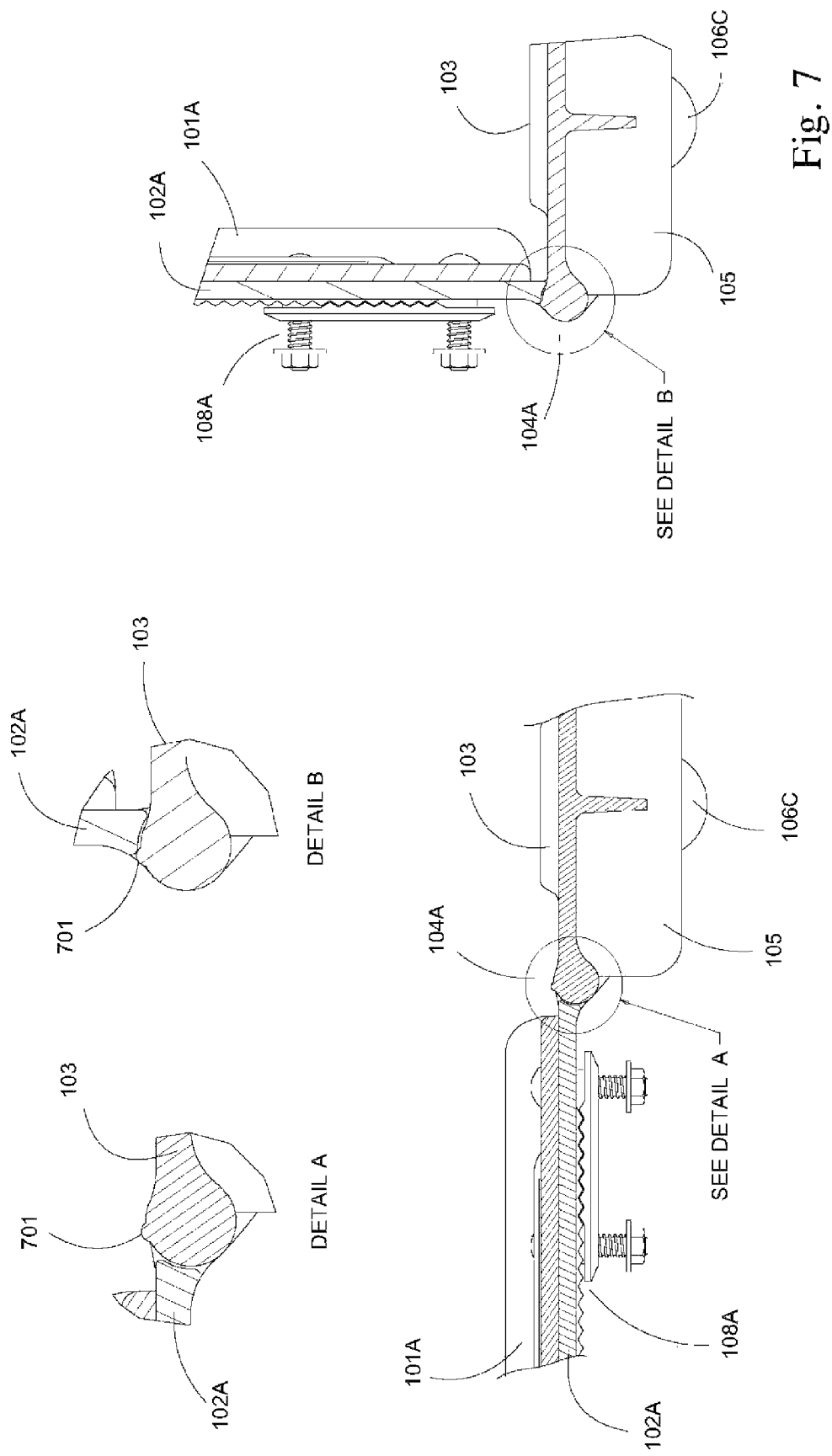
FIG. 7 illustrates a locking mechanism of the pet bed according to an embodiment of the present invention.

FIG. 7 illustrates a locking mechanism of the pet bed according to an embodiment of the present invention. As an example, FIG. 7 illustrates the locking mechanism in the rotating joint 104A. The same locking mechanism is also used for the other rotatable joint 104B. The rotating joint 104A comprises a portion of the joint 104A as part of the spine 103, and another portion of the joint 104A as part of the frame plate 102A. The two portions are coupled through the use of pins 302, as illustrated in FIG. 4. The portion of the joint 104A that is part of the spine 103 comprises a detent, which comprises a knot 701. In the unfolded position (see left bottom drawing of FIG. 7), the frame plate 102A does not engage the knot 701. As the frame plate 102A is rotated along the rotating joint 104A toward the folded position, the frame plate 102A engages the knot 701 and moves over the knot 701 with an extra amount of force applied to the frame plate 102A. Once the frame plates 102A-102B clears the knot 701 the frame plate 102A is prevented from moving back over the knot 701, unless additional force is applied. In this manner, the pet bed 100 may be locked in the folded position. Alternatively, other locking mechanisms may be used, such as a strap or a latch (not shown), without departing from the spirit and scope of the present invention.

Figure 8:
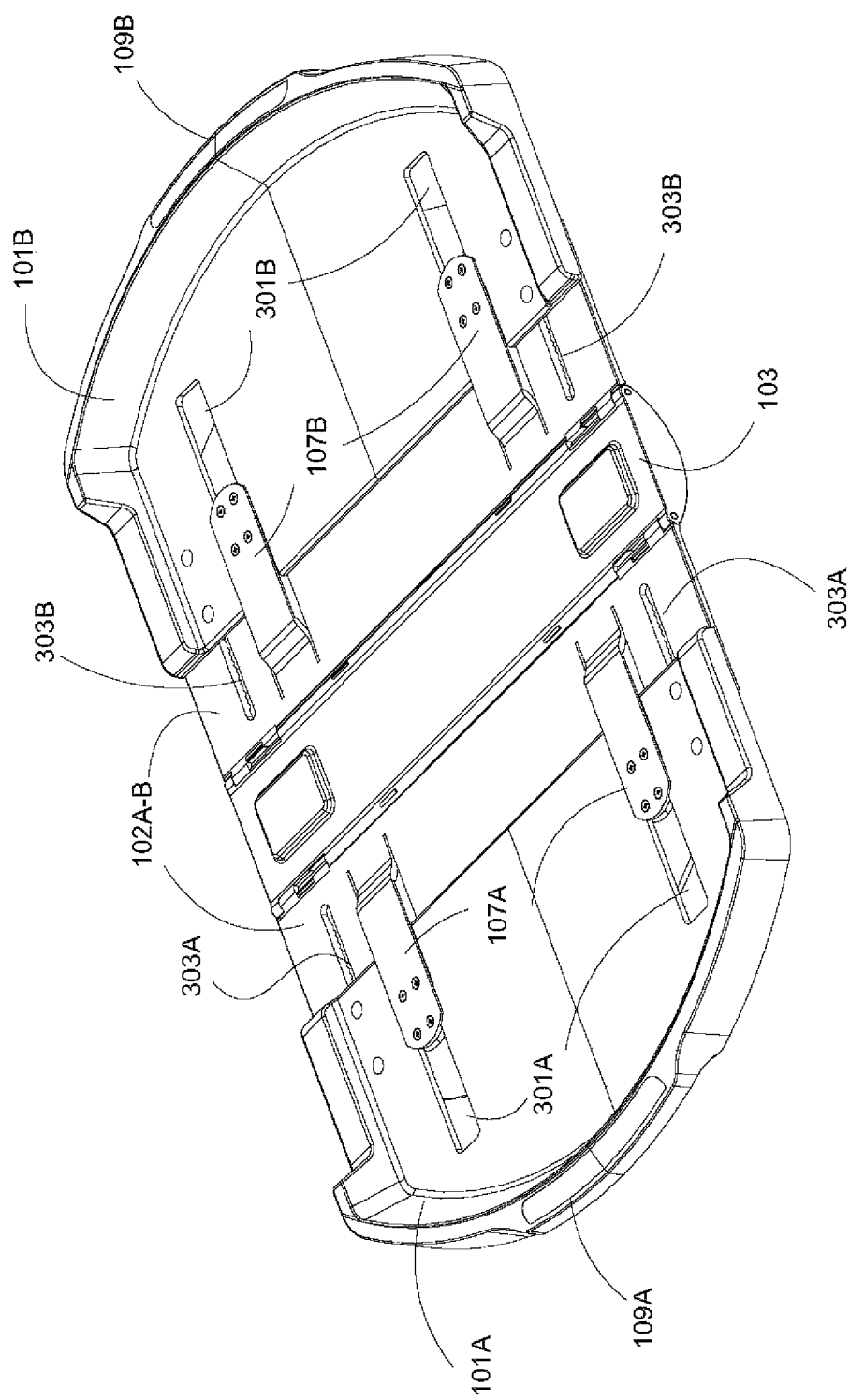
FIG. 8 illustrates an isometric top view of the pet bed with the trays extended according to an embodiment of the present invention.
Figure 9:
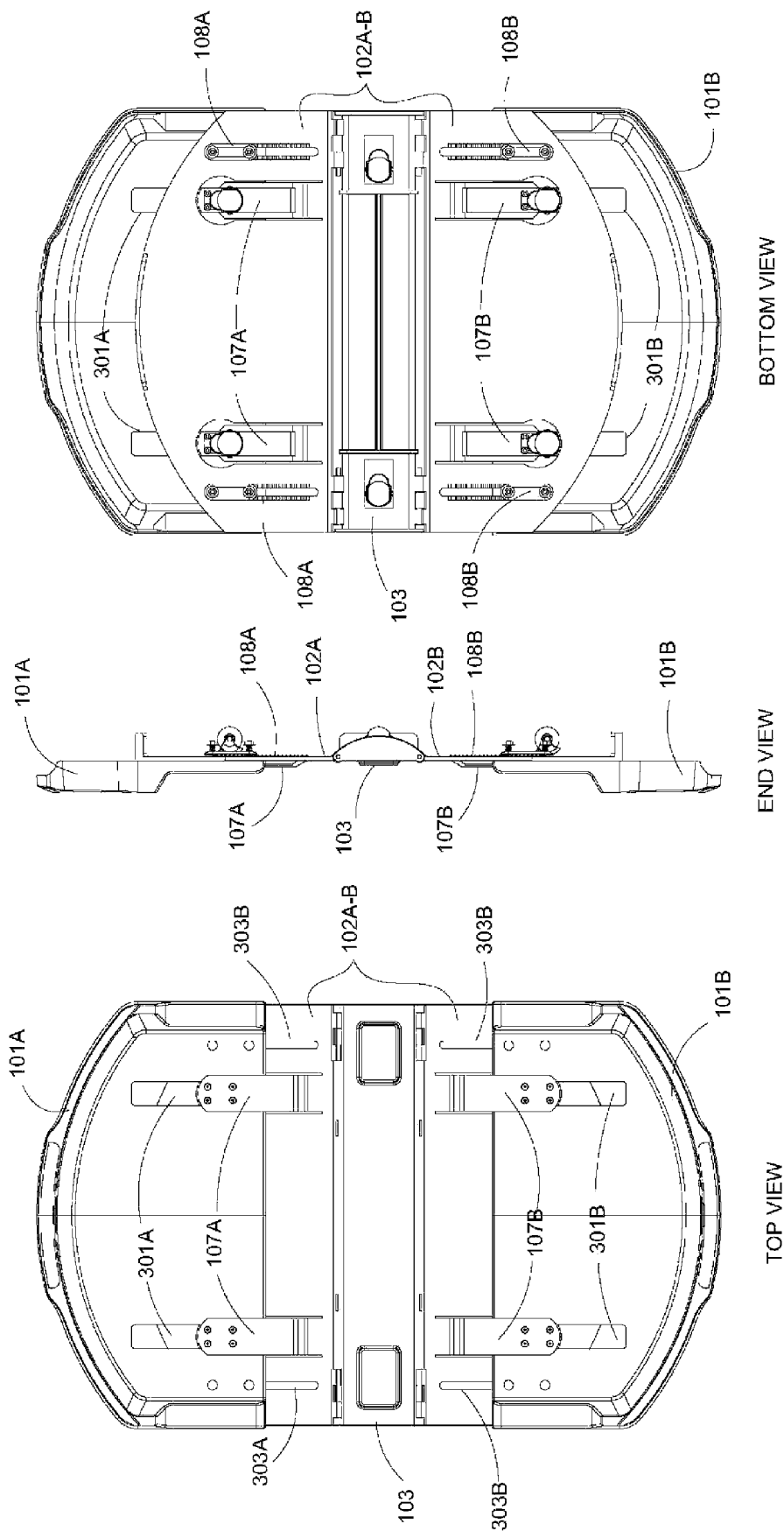
FIG. 9 illustrates top, end, and bottom orthogonal views of the pet bed with the trays extended according to an embodiment of the present invention.

FIG. 8 illustrates an isometric top view of the pet bed with the trays extended according to an embodiment of the present invention. FIG. 9 illustrates top, end, and bottom orthogonal views of the pet bed with the trays extended according to an embodiment of the present invention. To extend the trays 101A-101B, the fasteners 305 of the tray locks 108A-108B are first loosened to disengage the teeth of the plates 304 from the teeth 501A-501B proximate to the slots 303A-303B, if not already disengaged. Then the trays 101A-101B may be moved away from the spine 103, increasing the distance between the handles 109A-109B of the trays 101A-101B, by moving the fasteners 305 within the slots 303A-303B as they are coupled to the trays 101A-101B and the plates 304. The amount of extension of the trays 101A-101B is based on the position in which the tray locks 108A-108B are positioned within the slots 303A-303B. Once the desired extension is reached, the fasteners 305 are tightened to engage the teeth of the plates 304 with the teeth 501A-501B proximate to their corresponding slots 303A-303B to prevent the trays 101A-101B from moving out of position. The length of the slots 301A-301B are designed such that in all possible positions of the extended trays, the flexible arms 107A-107B are still able to flex and function as described above with reference to FIG. 6. Note that in this embodiment, when the trays 101A-101B are extended, portions of the frame plates 102A-102B become exposed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A folding pet bed, comprising:
   a frame, comprising a top face and a bottom face, and further comprising:
      a spine comprising a first side and a second side opposite to the first side;
      a first frame plate coupled to the first side of the spine to form a first rotating joint;
      a second frame plate coupled to the second side of the spine to form a second rotating joint;
      the first frame plate comprising a first plurality of flexible arms;
      the second frame plate comprising a second plurality of flexible arms, wherein each of the first and second pluralities of flexible arms comprises a first end fixably coupled to the corresponding frame plate and a second end not fixably coupled to the corresponding frame plate; and
      a plurality of casters coupled to the second ends of the first and second pluralities of flexible arms at the bottom face of the frame;
   a first tray coupled to the first frame plate at the top face of the frame; and
   a second tray coupled to the second frame plate at the top face of the frame,
   wherein the first tray comprises a first plurality of slots, wherein the second ends of the first plurality of flexible arms are able to flex through the first plurality of slots,
   wherein the second tray comprises a second plurality of slots, wherein the second ends of the second plurality of flexible arms are able to flex through the second plurality of slots.

2. The folding pet bed of claim 1, wherein the plurality of casters rest upon a surface when the pet bed resides in an unfolded position, wherein upon application of weight on the first and second trays toward the surface, the first and second pluralities of flexible arms flex away from the top face of the frame.

3. The folding pet bed of claim 2, wherein the frame further comprises a plurality of feet, wherein upon the application of the weight on the first and second trays toward the surface, the plurality of feet contact the surface.

4. The folding pet bed of claim 1, wherein the first tray coupled to the first frame plate and the second tray coupled to the second frame plate are each rotated along the first and second rotating joints to place the pet bed in a folded position.

5. The folding pet bed of claim 4, wherein the first rotating joint comprises a first detent and the second rotating joint comprises a second detent, the first detent comprising a first knot, the second detent comprising a second knot,
   wherein rotating the first tray past the first knot locks the first tray in the folded position,
   wherein rotating the second tray past the second knot locks the second tray in the folded position.

6. The folding pet bed of claim 1, wherein the frame further comprises a set of casters coupled to the spine.

7. A folding pet bed, comprising:
   a frame, comprising a top face and a bottom face, and further comprising:
      a spine comprising a first side and a second side opposite to the first side;
      a first frame plate coupled to the first side of the spine to form a first rotating joint;
      a second frame plate coupled to the second side of the spine to form a second rotating joint;
      the first frame plate comprising a first plurality of flexible arms;
      the second frame plate comprising a second plurality of flexible arms, wherein each of the first and second pluralities of flexible arms comprises a first end fixably coupled to the corresponding frame plate and a second end not fixably coupled to the corresponding frame plate; and
      a plurality of casters coupled to the second ends of the first and second pluralities of flexible arms at the bottom face of the frame;

a first tray coupled to the first frame plate at the top face of the frame;
a second tray coupled to the second frame plate at the top face of the frame;
the first tray comprising a first plurality of holes;
the first frame plate comprising a first plurality of slots and a first plurality of teeth proximate to the first plurality of slots; and
a first plurality of tray locks, comprising:
   a first plurality of plates comprising a first plurality of teeth; and
   a first plurality of fasteners traversing the first plurality of holes of the first tray and the first plurality of slots of the first frame plate and coupled to the first plurality of plates,
wherein the first plurality of teeth of the first plurality of plates engage the first plurality of teeth proximate to the first plurality of slots when the first plurality of fasteners are tightened.

8. The folding pet bed of claim 7, further comprising:
the second tray comprising a second plurality of holes;
the second frame plate comprising a second plurality of slots and a second plurality of teeth proximate to the second plurality of slots; and
a second plurality of tray locks, comprising:
   a second plurality of plates comprising a second plurality of teeth; and
   a second plurality of fasteners traversing the second plurality of holes of the second tray and the second plurality of slots of the second frame plate and coupled to the second plurality of plates,
wherein the second plurality of teeth of the second plurality of plates engage the second plurality of teeth proximate to the second plurality of slots when the second plurality of fasteners are tightened.

9. The folding pet bed of claim 8, wherein when the second plurality of teeth of the second plurality of plates do not engage the second plurality of teeth proximate to the second plurality of slots, the second plurality of fasteners are movable within the second plurality of slots to move the second tray toward or away from the spine.

10. The folding pet bed of claim 7, wherein when the first plurality of teeth of the first plurality of plates do not engage the first plurality of teeth proximate to the first plurality of slots, the first plurality of fasteners are movable within the first plurality of slots to move the first tray toward or away from the spine.

11. A folding pet bed, comprising:
a frame, comprising a top face and a bottom face, and further comprising:
   a spine comprising a first side and a second side opposite to the first side;
   a first frame plate coupled to the first side of the spine to form a first rotating joint;
   a second frame plate coupled to the second side of the spine to form a second rotating joint;
   the first frame plate comprising a first plurality of flexible arms;
   the second frame plate comprising a second plurality of flexible arms, wherein each of the first and second pluralities of flexible arms comprises a first end fixably coupled to the corresponding frame plate and a second end not fixably coupled to the corresponding frame plate;
   a plurality of casters coupled to the second ends of the first and second pluralities of flexible arms at the bottom face of the frame; and
   a plurality of feet coupled to the first frame plate, the second frame plate, and the spine;
a first tray coupled to the first frame plate at the top face of the frame; and
a second tray coupled to the second frame plate at the top face of the frame,
wherein the plurality of casters rest upon a surface when the pet bed resides in an unfolded position, wherein upon application of weight on the first and second trays toward the surface, the first and second pluralities of the flexible arms flex away from the top face of the frame and the plurality of feet contact the surface,
wherein the first tray comprises a first plurality of slots, wherein the second ends of the first plurality of flexible arms are able to flex through the first plurality of slots,
wherein the second tray comprises a second plurality of slots, wherein the second ends of the second plurality of flexible arms are able to flex through the second plurality of slots.

12. The folding pet bed of claim 11, wherein the first tray coupled to the first frame plate and the second tray coupled to the second frame plate are each rotated along the first and second rotating joints to place the pet bed in a folded position.

13. The folding pet bed of claim 11, wherein the frame further comprises a set of casters coupled to the spine.

14. The folding pet bed of claim 11, wherein the first rotating joint comprises a first detent and the second rotating joint comprises a second detent, the first detent comprising a first knot, the second detent comprising a second knot,
wherein rotating the first tray past the first knot locks the first tray in the folded position,
wherein rotating the second tray past the second knot locks the second tray in the folded position.

15. A folding pet bed, comprising:
a frame, comprising a top face and a bottom face, and further comprising:
   a spine comprising a first side and a second side opposite to the first side;
   a first frame plate coupled to the first side of the spine to form a first rotating joint;
   a second frame plate coupled to the second side of the spine to form a second rotating joint;
   the first frame plate comprising:
      a first plurality of flexible arms;
      a first plurality of slots; and
      a first plurality of teeth proximate to the first plurality of slots;
   the second frame plate comprising:
      a second plurality of flexible arms;
      a second plurality of slots; and
      a second plurality of teeth proximate to the second plurality of slots,
   wherein each of the first and second pluralities of flexible arms comprises a first end fixably coupled to the corresponding frame plate and a second end not fixably coupled to the corresponding frame plate; and
   a plurality of casters coupled to the second ends of the first and second pluralities of flexible arms at the bottom face of the frame;
a first tray coupled to the first frame plate at the top face of the frame, comprising a first plurality of holes;
a second tray coupled to the second frame plate at the top face of the frame, comprising a second plurality of holes;
a first plurality of tray locks, comprising:
   a first plurality of plates comprising a first plurality of teeth; and a first plurality of fasteners traversing the first plurality of holes of the first tray and the first plurality of slots of the first frame plate and coupled to the first plurality of plates, wherein the first plurality of teeth of the first plurality of plates engage the first plurality of teeth proximate to the first plurality of slots when the first plurality of fasteners are tightened; and a second plurality of tray locks, comprising:

a second plurality of plates comprising second plurality of teeth; and a second plurality of fasteners traversing the second plurality of holes of the second tray and the second plurality of slots of the second frame plate and coupled to the second plurality of plates, wherein the second plurality of teeth of the second plurality of plates engage the second plurality of teeth proximate to the second plurality of slots when the second plurality of fasteners are tightened.

16. The folding pet bed of claim 15, wherein when the first plurality of teeth of the first plurality of plates do not engage the first plurality of teeth proximate to the first plurality of slots, the first plurality of fasteners are movable within the first plurality of slots to move the first tray toward or away from the spine.

17. The folding pet bed of claim 15, wherein when the second plurality of teeth of the second plurality of plates do not engage the second plurality of teeth proximate to the second plurality of slots, the second plurality of fasteners are movable within the second plurality of slots to move the second tray toward or away from the spine.

\* \* \* \* \*